US007257840B2

(12) United States Patent
Ramaiah et al.

(10) Patent No.: US 7,257,840 B2
(45) Date of Patent: Aug. 14, 2007

(54) PREVENTING NETWORK DATA INJECTION ATTACKS USING DUPLICATE-ACK AND REASSEMBLY GAP APPROACHES

(75) Inventors: Anantha Ramaiah, San Jose, CA (US); Randall Stewart, Crystal Lake, IL (US); Peter Lei, Arlington Heights, IL (US); Patrick Mahan, Santa Cruz, CA (US)

(73) Assignee: Cisco Technology, Inc., San Jose, CA (US)

( * ) Notice: Subject to any disclaimer, the term of this patent is extended or adjusted under 35 U.S.C. 154(b) by 184 days.

(21) Appl. No.: 10/815,218

(22) Filed: Mar. 30, 2004

(65) Prior Publication Data
US 2005/0160293 A1 Jul. 21, 2005

Related U.S. Application Data

(63) Continuation-in-part of application No. 10/792,146, filed on Mar. 2, 2004.

(60) Provisional application No. 60/537,372, filed on Jan. 16, 2004.

(51) Int. Cl.
| | |
|---|---|
| G06F 11/30 | (2006.01) |
| G01R 31/08 | (2006.01) |
| G06F 11/00 | (2006.01) |
| G06F 15/16 | (2006.01) |
| G08C 15/00 | (2006.01) |
| H04J 3/14 | (2006.01) |
| H04J 1/16 | (2006.01) |
| H04L 12/26 | (2006.01) |

(52) U.S. Cl. .................. 726/22; 709/232; 709/228; 370/235; 726/23
(58) Field of Classification Search ............... 709/228, 709/232; 370/235
See application file for complete search history.

(56) References Cited

U.S. PATENT DOCUMENTS

| | | | |
|---|---|---|---|
| 7,013,482 | B1 | 3/2006 | Krumel et al. |
| 2002/0101819 | A1 | 8/2002 | Goldstone |
| 2002/0145976 | A1* | 10/2002 | Meyer et al. ............... 370/235 |
| 2003/0154399 | A1* | 8/2003 | Zuk et al. .................. 713/201 |
| 2003/0191844 | A1* | 10/2003 | Meyer et al. ............... 709/227 |
| 2004/0052234 | A1* | 3/2004 | Ameigeiras et al. ........ 370/338 |
| 2005/0039104 | A1 | 2/2005 | Shah et al. |

OTHER PUBLICATIONS

Stewart, R., "Transmission Control Protocol security considerations draft-ietf-tcpm-tcpsecure-00.txt", Network Working Group (Draft, 2004); pp. 1-10.

Primary Examiner—Christopher Revak
Assistant Examiner—Arezoo Sherkat
(74) Attorney, Agent, or Firm—Hickman Palermo Truong & Becker LLP

(57) ABSTRACT

Approaches for preventing TCP data injection attacks in packet-switched networks are disclosed. An ACK message or dummy segment is sent to verify the authenticity of the data in the re-assembly buffer, and to help discard spurious data faster. These approaches involve the sender in detection of spurious data, and make improved use of mechanisms for processing ACK messages that are native to typical TCP implementations. The latter approach may be implemented without modification of the sender's TCP implementation. Further, the receiver's TCP implementation maintains compatibility with RFC 793.

32 Claims, 8 Drawing Sheets

OTHER PUBLICATIONS

"Transmission Control Protocol", *Information Sciences Institute* (1981), 89 pages.

International Searching Authority, "Notification of Transmittal of the International Search Report and the Written Opinion of the International Searching Authority, or the Declaration," PCT/US05/01020, Received Mar. 10, 2006, 9 pages.

Current Claims, PCT/US05/01020, 5 pages.

Stewart, R. "Transmission Control Protocol Security Considerations," Network Working Group Internet Draft, Apr. 19, 2004, 11 pages.

International Searching Authority, "Notification of Transmittal of the International Search Report and the Written Opinion of the International Searching Authority, or the Declarations," PCT/US05/00551, dated May 26, 2006, 7 pages.

Current Claims, PCT/US05/00551, 4 pages.

* cited by examiner

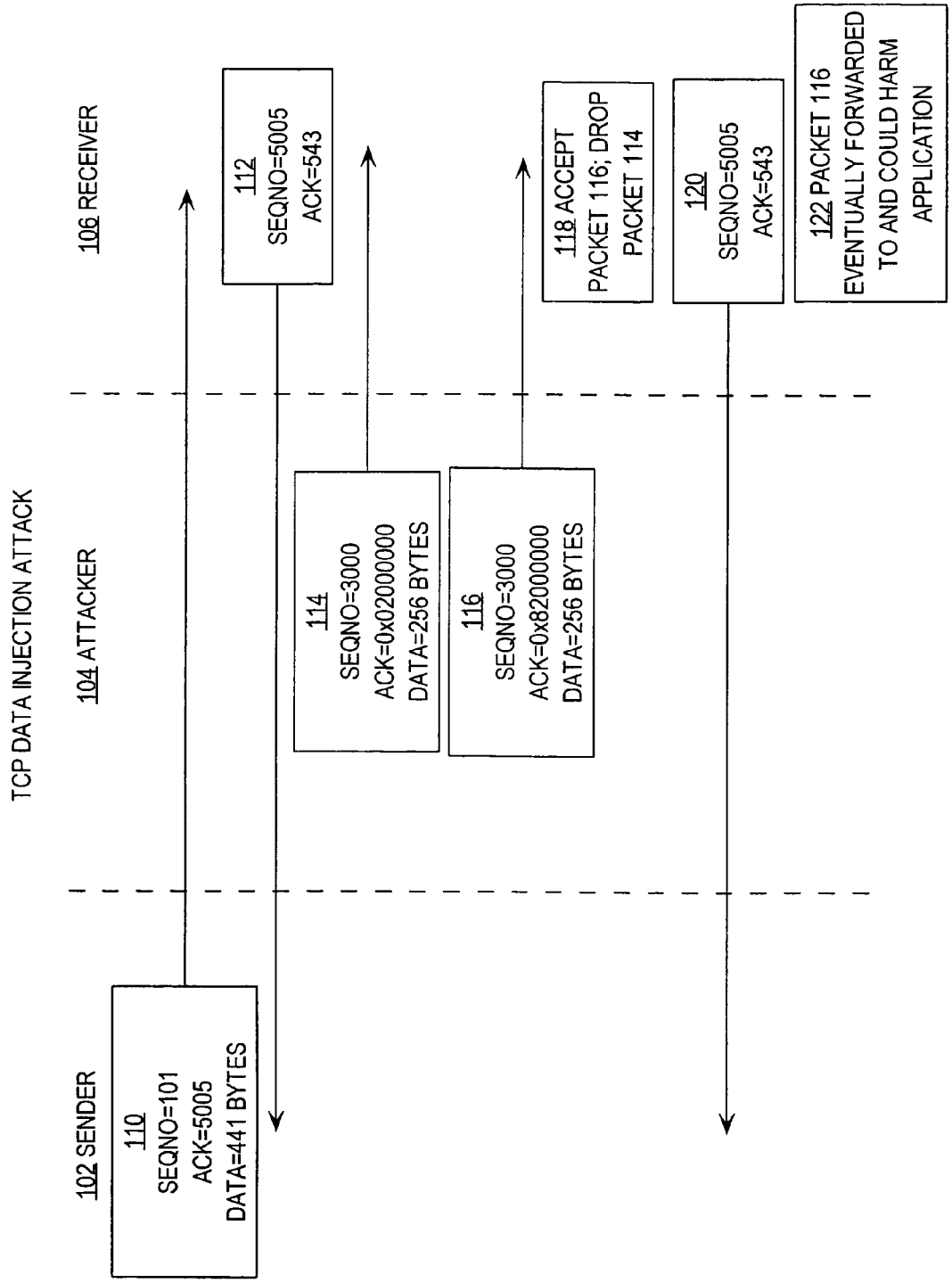

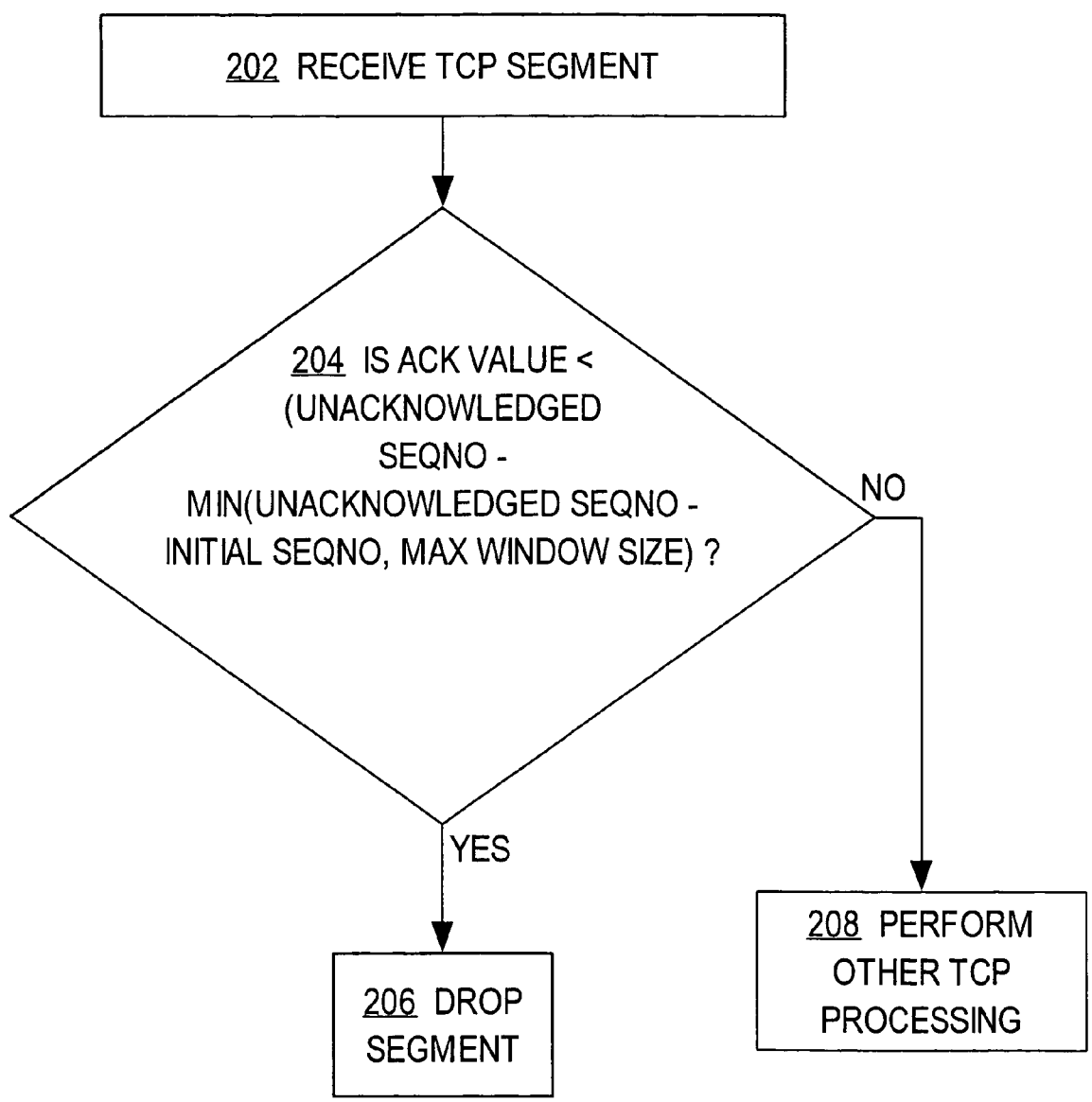

DUPLICATE ACK METHOD--RECEIVER'S STEPS

DUPLICATE ACK METHOD--STEPS AS PERFORMED BY SENDER
AS ATTACKER IS SENDING SPURIOUS SEGMENTS

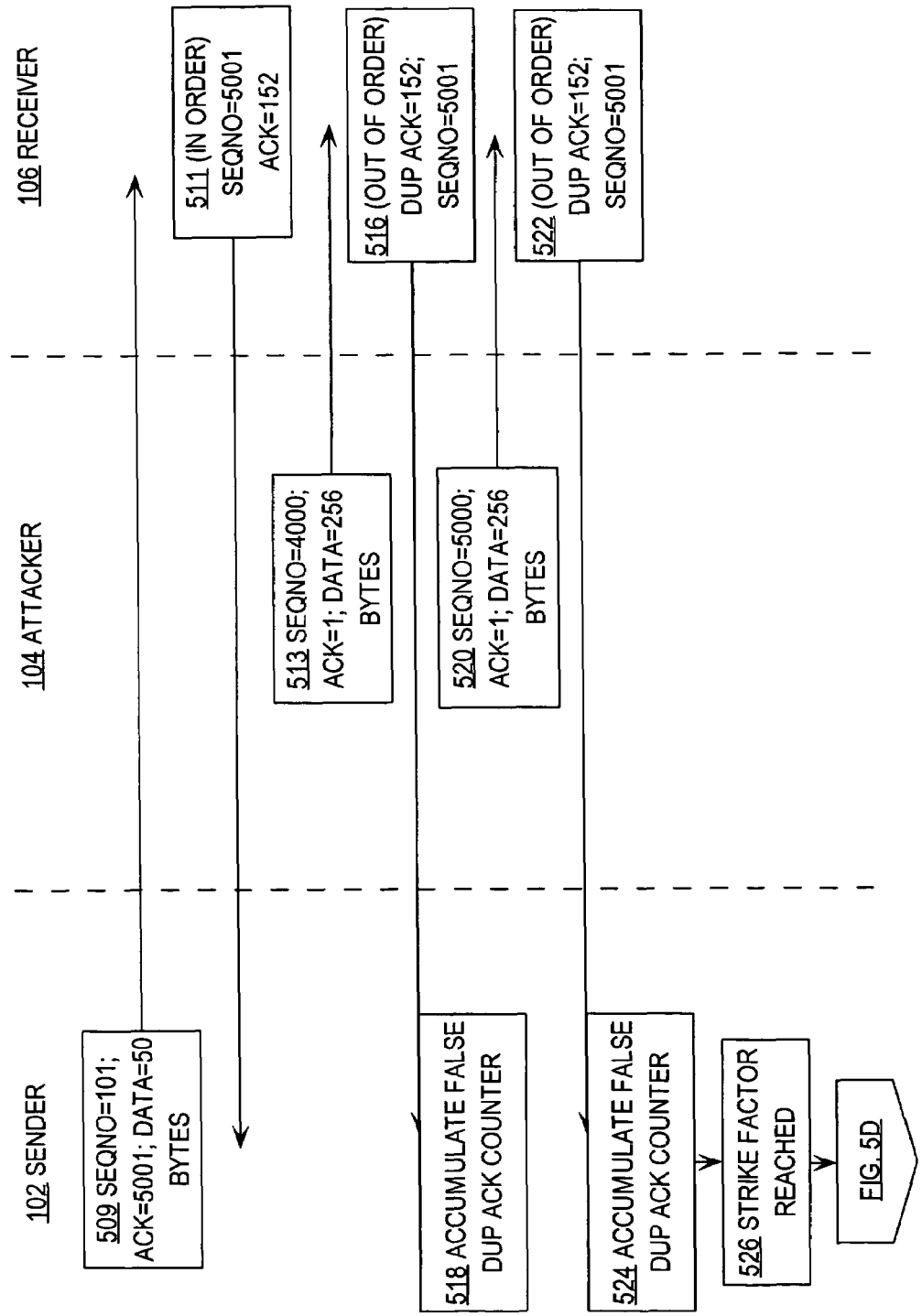

PREVENTING NETWORK DATA INJECTION ATTACKS USING DUPLICATE-ACK AND REASSEMBLY GAP APPROACHES

CROSS-REFERENCE TO RELATED APPLICATIONS

This application claims domestic priority under 35 U.S.C. §120 as a Continuation-in-part of prior application Ser. No. 10/792,146, filed 2 Mar. 2004, of Anantha Ramaiah, et al., entitled "Preventing Network Data Injection Attacks,", which claims priority from prior provisional application 60/537,372, filed 16 Jan. 2004, of the same inventors and having the same title, the entire contents of which are hereby incorporated by reference as if fully set forth herein.

FIELD OF THE INVENTION

The present invention generally relates to computer networks. The invention relates more specifically to preventing data injection attacks in networks.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Networks have become an important tool for businesses and consumers alike, many of which are now dependent on the constant availability of network resources such as mail servers, Web sites, and content servers. As use of networks increases, protecting networks from disruption by malicious entities becomes more important. For example, denial of service ("DoS") attacks may deprive legitimate users of access to network services, and have been used successfully to disrupt legitimate user access to internet sites such as Yahoo! and CNN.

Data injection attacks may result in DoS or other adverse effects. One type of data injection attack takes advantage of the basic design of the Transmission Control Protocol ("TCP"), one of the foundational protocols of the Internet, as defined in Internet Engineering Task Force (IETF) Request for Comments (RFC) 793. In a data injection attack, an attacker guesses parameter values for a valid TCP connection and then sends spurious segments that contain malicious or spurious data payloads. If the receiver passes such segments to an application, malfunctions may occur when the application acts on or executes the data payloads.

A typical implementation of TCP that is compliant with RFC 793 and is acting as a receiver of data maintains out-of-order data in a re-assembly buffer pending receipt of any missing segments. The receiver sends an acknowledgment ("ACK") message for each segment that is received out of order and indicating the last valid sequence number. The sender holds non-acknowledged segments in a re-transmission buffer. This process enables a sender to rapidly re-transmit segments that have been lost in transmission, because such segments are not acknowledged.

One type of TCP data injection attack exploits the foregoing mechanisms in TCP implementations that are intended to manage segments that arrive out-of-order and need to be re-assembled into the proper order before they are passed to applications at logical layers above TCP. Border Gateway Protocol (BGP), Hypertext Transfer Protocol (HTTP), some voice protocols, Multi-Protocol Label Switching (MPLS), and other protocols use TCP connections and are targets for these attacks. The consequences can be severe. For example, when a BGP session of a router is disrupted by closing the associated TCP connection, the router will discard all BGP routes that it has created, essentially causing a failure of the BGP process. As a result, the BGP process must re-synchronize itself with peer routers in the network, and during the re-synchronization period the failed router cannot forward any traffic.

Further, data injection attacks may result in presenting malicious commands to an upstream process, needlessly filling the re-assembly buffer, faulty operation of other higher-layer applications, initiating "ACK wars," etc. Accordingly, researchers in this field are interested in creating ways to thwart TCP data injection attacks, without fundamentally altering the operation of TCP as specified in RFC 793.

A successful attack must inject a TCP segment that carries proper values for source port, destination port; a range of values is allowed for sequence number and ACK number. The allowed ranges for these values are large, so that mounting a brute-force attack involving serially checking all possible values for each parameter would seem impossible. However, in most TCP implementations the task of selecting valid values is simpler because certain loopholes present in RFC 793. These loopholes create security vulnerabilities in implementations that are compliant with RFC 793. For example, assigning a pseudo-random 32-bit value as the Initial Sequence Number (ISN) for a new TCP connection might appear to prevent an attacker from guessing the correct sequence number in any practical way, because the number of potentially correct values is $2^{32}$ or approximately 4 billion values. However, a conventional TCP implementation compliant with RFC 793 will accept a segment if the sequence number of the segment falls within a window or range of acceptable values, even if the sequence number is not an exact match to the next expected sequence number. The window or range typically is the same as the size in bytes of the re-assembly buffer, and is used to compensate for the possibility that segments may be lost. In some implementations of TCP the range of allowed sequence values may be as large as 16,384,65,535, or larger.

A consequence is that the attacker does not need to generate all 32 bits of the sequence number correctly to provide a number that a receiving node will accept, even when a truly random or pseudorandom ISN is used. If the range of allowed sequence values is sufficiently large, then the chance is greatly increased that an attacker can guess a correct sequence value through either random or brute-force selection in a practical amount of time. The larger the window established by the receiving node, the easier it is for the hacker to carry out this attack.

Further, most implementations use a relatively small range of values for the initial port number, and merely increment the port number for each new connection. As a result, using ordinary computing resources it may be relatively easy for an attacker to guess the port values that are used by two endpoints to a legitimate TCP connection.

Still another vulnerability occurs because most TCP implementations do not test whether the ACK value is equal to an expected ACK value or even within a range of allowed ACK values. Instead, most implementations will accept any segment that carries an ACK value greater than a previously received ACK value, provided the sequence number is within the allowed range. RFC 793 defines an ACK value as an unsigned integer in the range 1 to $2^{32}$. Thus, an attacker who guesses an allowed sequence number can succeed with a data injection attack by trying only two ACK values—one (1) or $2^{32}-1$—and one or the other is certain to be accepted.

The result of the foregoing compromises is that an attacker can theoretically inject data into a connection in ($2^{32}$/window-size/2) segments, or roughly 30,000 segments in most implementations. Therefore even a brute-force attack can proceed relatively rapidly using conventional computing equipment.

Approaches for preventing network DoS Reset attacks are described in co-pending application Ser. No. 10/755,146, filed Jan. 9, 2004, entitled "Preventing Network Reset Denial of Service Attacks," by Mitesh Dalal et al., Attorney Docket No. 50325-0868. An approach for addressing a similar attack, known as the SYN-RST attack, is provided in co-pending application Ser. No. 10/641,494, filed Aug. 14, 2003, entitled "Detecting network denial of service attacks," of Pritam Shah et al., and assigned to the same assignee hereof. The approach of Shah et al. is appropriate for an intermediate router rather than a TCP endpoint device, but does not fully address all issues described in this disclosure.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a message flow diagram that illustrates one technique for perpetrating a TCP data injection attack;

FIG. 2 is a flow diagram that illustrates an approach for discarding data segments upon arrival;

FIG. 5C is a message flow diagram that illustrates an example of operation of FIG. 5A;

DETAILED DESCRIPTION

Figure 4:
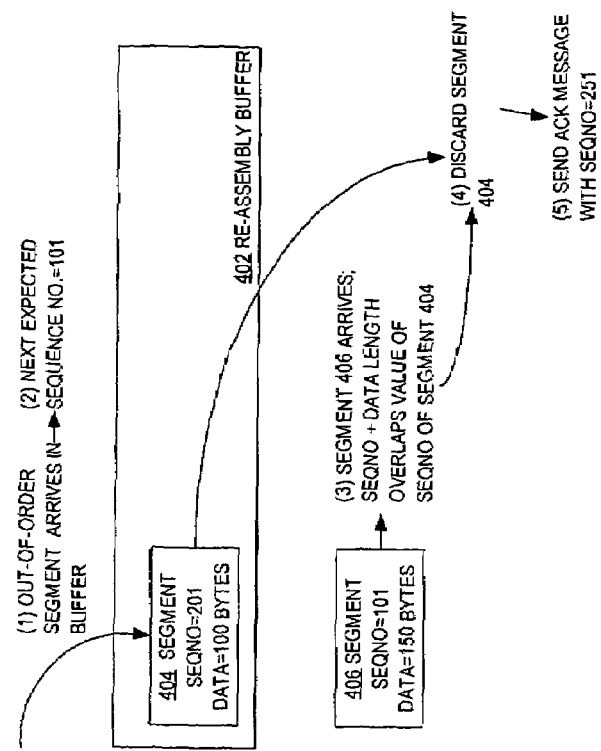
FIG. 4 is a block diagram that shows an example of operation of FIG. 3.

A method and apparatus for preventing network data injection attacks is described. In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

Embodiments are described herein according to the following outline:

1.0 Overview
2.0 Approaches for Preventing Network Data Injection Attacks
    2.1 Approach for Discarding Data Segments Upon Arrival
    2.2 Approach for Removing Spurious Data Segments from Re-Assembly buffer Based On Overlap
    2.3 Approach for Removing Spurious Data Segments from Re-Assembly buffer Using Duplicate ACK Messages As Trigger
    2.4 Approach for Removing Spurious Data Segments from Re-Assembly buffer Based On Analyzing Re-Assembly Gap
3.0 Implementation Mechanisms-Hardware Overview
4.0 Extensions and Alternatives 1.0 OVERVIEW As an introduction only, and without limiting the scope of appended claims the needs identified in the foregoing Background, and other needs and objects that will become apparent for the following description, are achieved in the present invention, which comprises, in one aspect, a method for preventing an attack on a network, wherein the attack comprises injecting a spurious transmission control protocol (TCP) segment into a TCP connection between a sender and a receiver, comprising the computer-implemented steps of receiving a duplicate ACK message and incrementing a duplicate ACK counter; when a re-transmission buffer is empty and the duplicate ACK counter is equal to a specified strike factor, sending a corrective ACK message that provides a correct sequence value and ACK value. A receiver continues by receiving the corrective ACK message; determining whether the correct sequence value is less than the highest sequence value of all segments in the re-assembly buffer; and discarding all segments from the re-assembly buffer when the correct sequence value is less than the highest sequence value of all segments in the re-assembly buffer.

Another approach provides for receiving a second TCP segment; determining a sequence value gap as between the second TCP segment and the first TCP segment previously placed in a re-assembly buffer; determining whether the sequence value gap is too large according to a specified heuristic; if the sequence value gap is too large, then performing the steps of: creating and sending a dummy segment carrying a first sequence value that is just prior to a last properly acknowledged sequence value; receiving an acknowledgment of the dummy segment; determining whether a second sequence value carried in the acknowledgment is less than a third sequence value of the first TCP segment; and discarding the first TCP segment from the re-assembly buffer when the second sequence value carried in the acknowledgment is less than the third sequence value of the first TCP segment.

In other aspects, the invention encompasses a computer apparatus and a computer-readable medium configured to carry out the foregoing steps. Further, many other features and aspects will become apparent from the following description and from the appended claims.

2.0 APPROACHES FOR PREVENTING TCP DENIAL OF SERVICE ATTACKS

Several approaches for preventing network data injection attacks are described. A first approach provides for dropping received segments that carry ACK values smaller than the next unacknowledged sequence minus the maximum window size. The term "smaller" is used herein in the context of unsigned integer values in which wraparound may occur. This approach helps keep spurious injected segments out of the TCP re-assembly buffer. Only a small change in the logic of a TCP process acting as receiver is needed. In a second approach, heuristics are used to examine the sequence number of a newly arrived segment, and when the sequence number is the next expected, then the newly arrived segment is used and the contents of the re-assembly buffer are not considered. Further, if the data payload of the newly arrived segment overlaps in sequential order with segments already in the re-assembly buffer, the overlapped segments in the re-assembly buffer are considered spurious and are discarded. Thus, this approach helps remove spurious data from the re-assembly buffer if the first approach somehow fails to prevent the data from entering the re-assembly buffer.

In the third and fourth approaches, an ACK message or dummy segment is sent to verify the authenticity of the data in the re-assembly buffer, and to help discard spurious data faster. These approaches involve the sender in detection of spurious data, and make improved use of mechanisms for processing ACK messages that are native to typical TCP implementations. The fourth approach may be implemented without modification of the sender's implementation. Further, an implementation of the approaches in a receiver maintains compatibility with RFC 793.

2.1 Approach for Discarding Data Segments Upon Arrival

A first approach for preventing TCP data injection attacks is now described with reference to FIG. 1 and FIG. 2. FIG. 1 is a message flow diagram that illustrates one technique for perpetrating a TCP data injection attack. FIG. 2 is a flow diagram that illustrates an approach for discarding data segments upon arrival.

The process of FIG. 2 to cause the message flows shown by example in FIG. 1 may be implemented in one or more computer programs, sequences of instructions or other software elements that are executed by a network element acting as an endpoint in a TCP connection. For example, FIG. 2 may be implemented as part of a TCP application or feature of an operating system of a router, switch or other element of network infrastructure. Alternatively FIG. 2 may be implemented as a TCP process, stack, adapter or agent hosted by or associated with the operating system of a personal computer, workstation or other network end station.

In FIG. 1, Sender 102, Attacker 104 and Receiver 106 represent endpoints in a TCP connection. Sender 102, Attacker 104 and Receiver 106 may comprise routers, switches, hubs, gateways, personal computers, workstations, servers, or other devices that are or can be connected to or communicate with a network. Attacker 104 is any entity that is injecting unwanted or spurious segments or segments into a TCP flow or connection that has been established between Sender 102 and Receiver 106. Attacker 104 may comprise a workstation, personal computer, router, switch, or other processing element.

Sender 102, Receiver 106, and Attacker 104 participate in one or more networks. Further, Sender 102, Receiver 106, and Attacker 104 may be in or accessible through a local area network (LAN), wide area network (WAN), one or more internetworks, or any other kind of network or subset thereof, in which the Transmission Control Protocol (TCP) is used to establish connections between network elements. Such a network may contain additional network infrastructure elements such as routers, switches, etc. and other end station devices such as workstations, printers, servers, etc. In one implementation, Sender 102, Receiver 106, and Attacker 104 all are communicatively coupled to a public packet-switched network such as the internet.

Sender 102, Receiver 106, and Attacker 104 may be connected to additional network elements. Other embodiments may include fewer or more network elements than those illustrated. Specifically, in a practical system there may be any number of network elements.

For purposes of describing FIG. 1, assume that Sender 102 and Receiver 106 implement TCP only as defined in RFC 793, and are using a window size of 4000. Sender 102 sends Receiver 106 a segment 110 with a sequence number ("SeqNo") of 101, an ACK value of 5005 and 441 bytes of data. Receiver 106 sends an acknowledgment message 112 with SeqNo 5005 and ACK 543. In this description, a reference such as "SeqNo 543" or "ACK 5005" is used as an abbreviated indication that a TCP segment carries a Sequence Number value of 543 and an Acknowledge value of 5005, respectively.

Next Attacker 104 sends segment 114 with SeqNo 3000, ACK 0×2000000 (33,554,432), and 256 bytes of malicious data. Attacker 104 has guessed SeqNo 3000 without actual knowledge of the sequence numbers that are then currently in use by Sender 102 and Receiver 106 for the TCP connection, and SeqNo 3000 is an allowed SeqNo value because (3000<543+4000). No window size comparison is conventionally made for the ACK value, so ACK values in the range of 2,147,488,649 to 4,294,967,295 and 0 to 5001 are acceptable. Attacker 104 has also determined or guessed the network addresses of Sender 102 and Receiver 106, such as their IP addresses, and the port numbers used for the current connection. The address and port values are placed in the spurious segment 114, but are omitted for clarity. Since Attacker 104 is uncertain whether an ACK value of 0×2000000 (33,554,432) is appropriate, Attacker 104 also sends segment 116 with the same SeqNo 3000 but an ACK value of 0×82000000 (2,181,038,080)).

At step 118, Receiver 106 accepts segment 116 but drops segment 114 because its ACK value is not acceptable. Receiver then acknowledges segment 116 by sending segment 120 with SeqNo 5005 and ACK 543. A SeqNo of 5005 is used because segment 112 is the last in-order segment that was received, and Receiver 106 needs to signal that it is awaiting the immediately following segment despite having received segment 116 that appears to be far in the future of the stream. Without a defensive approach, as indicated in step 122, segment 116 is eventually forwarded to and could harm an application that uses, relies on or executes the data in segment 116.

Referring now to FIG. 2, in the first preventive approach herein, in step 202 a TCP segment is received. In step 204, a test is performed to determine if the ACK value carried in the received segment is less than the difference of the next sent but unacknowledged sequence value (snduna, in the parlance of RFC 793) less the lesser of either the total number of segments sent thus far or the maximum window size associated with the TCP connection. In one embodiment, the expression min(snduna—isn, max window size) yields the value that is compared to the unacknowledged sequence value.

The maximum window size value reflects the maximum window size that the peer can manage. The allowed window size may be changed to another window size for particular exchanges of segments, but even if such an adjustment has occurred, the maximum window size is used in the test of step 204. Thus step 204 tests the ACK value of the received segment against a window of past valid ACK values. For step 204 to yield a true result, a valid ACK value cannot be more than one window behind the next expected sequence value.

In contrast, prior approaches admit segments having any ACK value that is within that half of the sequence value space that includes and is earlier than the next unacknowledged sequence value, and provided that the sequence value itself is within the inbound window. In such circumstances RFC 739 permits a receiver to ignore the ACK. RFC 793 only requires that if a received ACK value is greater than that expected by the receiver, then the receiver must send back an ACK segment specifying the expected ACK value. The lack of rigorous requirements in RFC 793 for dealing with ACK values that are earlier than expected presents an attacker with a way to present spurious segments that will be accepted.

If the test of step 204 is true, then in step 206 the segment is dropped and not forwarded to an application or placed in a re-assembly buffer for potential re-ordering and later forwarding. If the test of step 204 is false, then in step 208 other TCP segment processing is performed on the received segment.

In one alternative, the test of step 204 does not allow for the ACK value to fall within a window but instead tests whether the ACK value of the received TCP segment is exactly equal to an expected ACK value or a range of values less than the initial window. If an exact match is not found, then the incoming segment is dropped. This alternative may cause a receiver to discard data that arrives before other valid but delayed data, because when the earlier data arrives the receiver requires an ACK value that the sender has not encountered yet. As a consequence, this approach may force the sender to perform a retransmission. However, this drawback may be acceptable to achieve the benefit of improved attack resistance in network environments that are known to have higher vulnerability to attack.

Using the foregoing approaches, spurious segments are kept out of the re-assembly buffer and not forwarded to higher-layer applications or processes where the spurious segments could cause problems. In particular, with the present approach, a segment is accepted only if its sequence number is within the acceptable window and its ACK value is correct.

Figure 3:
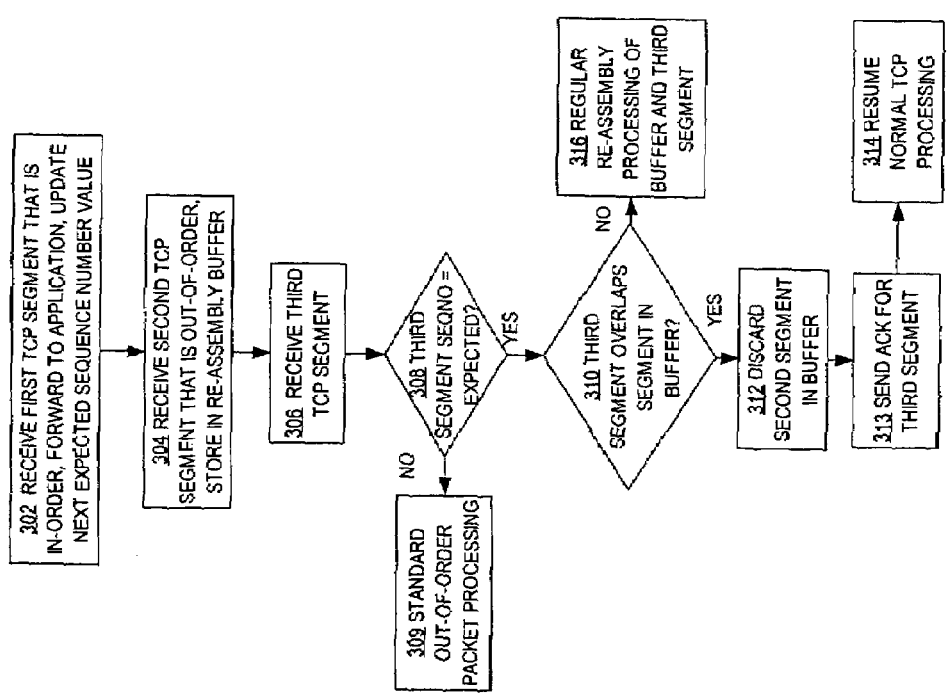
FIG. 3 is a flow diagram that illustrates an approach for removing spurious data segments from a re-assembly buffer based on overlap.

2.2 Approach for Removing Spurious Data Segments from Re-Assembly Buffer Based on Overlap FIG. 3 is a flow diagram that illustrates an approach for removing spurious data segments from a re-assembly buffer based on overlap; FIG. 4 is a block diagram that shows an example of operation of FIG. 3. In general, FIG. 3 provides an approach for removing improperly injected segments from a TCP re-assembly buffer by detecting that the segments are spurious because they improperly overlap data associated with previously received properly acknowledged segments.

Referring first to FIG. 3, steps 302-304 represent preparatory steps that are described to provide context for the solution represented by subsequent steps. In step 302 a first TCP segment is received that is in order. The segment is forwarded to an application, and the next expected sequence number value is updated in memory. The term "first" is used in step 302 to denote that the segment of step 302 occurs before the segments of step 304 and step 306, but the segment of step 302 may arrive at any time after establishment of a TCP connection and need not be the first segment actually received after completing a TCP handshake phase. In step 304, a second segment is received that is out of order, and therefore the second segment is stored in the re-assembly buffer.

In step 306, a third segment is received. In step 308, a test is performed to determine if the SeqNo value carried by the third segment is equal to the next expected SeqNo value. Step 308 also may involve verifying that the sum of the SeqNo of the third segment and the length of its data exactly aligns with other segments in the re-assembly buffer. If not, then in step 309 conventional processing is applied for an out-of-order segment. If the SeqNo value is exactly the next expected value, then the third segment is treated as a trusted segment that has arrived from a legitimate sender in the current connection. The third segment is treated as trusted because the chance that an attacker guessed and sent the exact next expected SeqNo value is 1 in 2³².

Accordingly, in step 310 a test is performed to determine if the third segment overlaps any segment that is already in the re-assembly buffer. In this context, "overlap" means that the sum of the SeqNo and the length of the data carried in the third segment overlaps the SeqNo in any segment(s) in the re-assembly buffer. In some cases the third incoming segment may overlap a number of segments that may have come from an attacker. If no such overlap holds, then in step 316 regular re-assembly processing of the buffer and third segment is performed.

However, if overlap is found, then the overlapped segments previously received into in the re-assembly are deemed spurious segments, and the third segment is deemed genuine. Overlap indicates a spurious segment has been received into the re-assembly buffer because a set of genuine segments ultimately will align exactly in sequence when successive SeqNo values are compared to the data length size of a preceding segment in the flow. Moreover, an attacker is required to guess SeqNo values, and therefore the presence of overlap strongly suggests that a SeqNo has been guessed and the associated segment is spurious. Overlap as found in step 310 may be complete overlap or partial overlap. The spurious segment is discarded from the re-assembly buffer at step 312.

In step 313 an ACK message is sent and carries the SeqNo of the third segment. In step 314, normal TCP processing resumes. Such processing may include re-transmission that helps ensure that the re-assembly buffer contains only valid data by requiring the sender to re-transmit data within the range covered by the discarded spurious segment.

An example is now illustrated in connection with FIG. 4. An out-of-order segment 404 with SeqNo 201 and 100 bytes of data previously has been received into re-assembly buffer 402, as shown by numeral 1. As indicated by numeral 2, the next expected sequence number is 101, which is why segment 404 is considered out of order.

At numeral 3, segment 406 arrives with SeqNo 101 and 150 bytes of data. The SeqNo value 101 is exactly the expected next SeqNo value, and therefore the test of step 308 (FIG. 3) is true for segment 406. Further, the sum of 101 and 150 is 251, which overlaps the value of 201 carried by segment 404. Since segment 406 is considered trusted because it carries the exact next expected sequence number, segment 404 is deemed spurious and discarded as shown at numeral 4. An ACK segment is then sent with SeqNo 251 to acknowledge segment 406.

Thus the foregoing approach removes spurious injected data segments that have been inadvertently received into a re-assembly buffer. The approach may be practiced alone or in combination with the approach of section 2.1 herein.

Figure 5B:
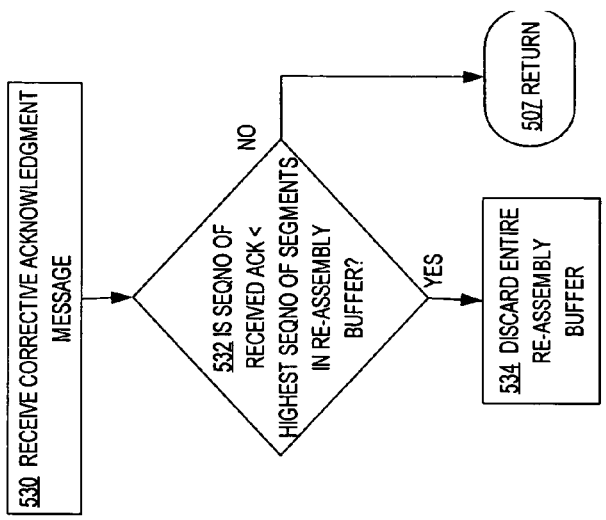
FIG. 5B is a flow diagram that illustrates steps in the approach performed by a receiver of data for removing spurious data segments from a re-assembly buffer using duplicate ACK messages as a trigger.
Figure 5A:
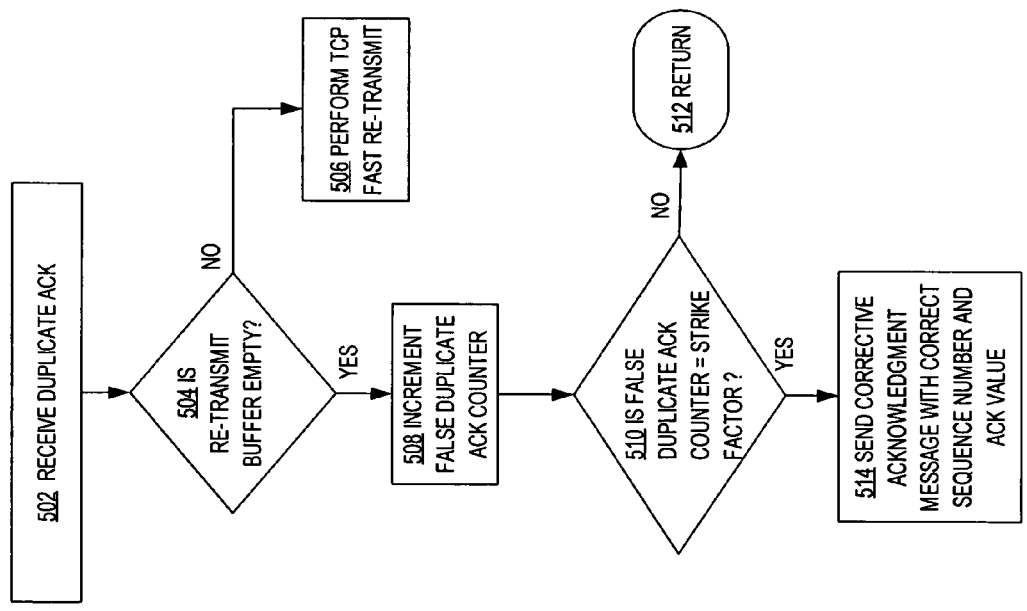
FIG. 5A is a flow diagram that illustrates an approach performed by a sender of data for removing spurious data segments from a re-assembly buffer using duplicate ACK messages as a trigger.
Figure 5D:
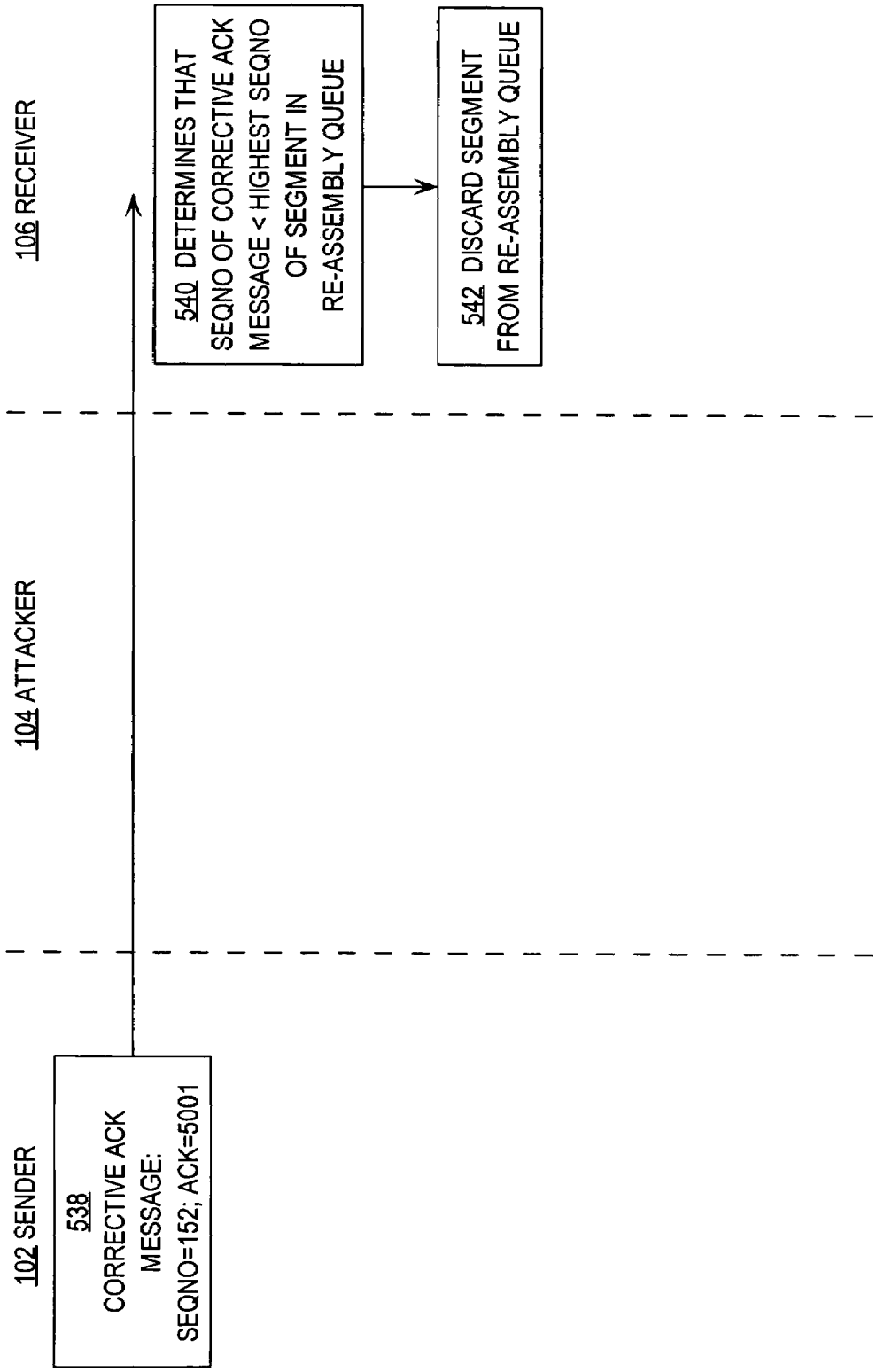
FIG. 5D is a message flow diagram showing further steps in the example of FIG. 5C.

2.3 Approach for Removing Spurious Data Segments from Re-Assembly Buffer Using Duplicate ACK Messages as Trigger FIG. 5A is a flow diagram that illustrates an approach performed by a sender of data for removing spurious data segments from a re-assembly buffer using duplicate ACK messages as a trigger; FIG. 5B is a flow diagram that illustrates steps in the approach performed by a receiver of data for removing spurious data segments from a re-assembly buffer using duplicate ACK messages as a trigger; FIG. 5C is a message flow diagram that illustrates an example of operation of FIG. 5A; and FIG. 5D is a message flow diagram showing further steps in the example of FIG. 5C.

In describing FIG. 5A-FIG. 5D, the term "retransmission buffer" refers to a data structure that contains one or more data segments that have been sent but are not yet acknowledged, and the "re-assembly buffer" refers to a data structure in which received out-of-order data is stored.

In conventional TCP processing, for each segment injected into the re-assembly buffer, TCP generates a duplicate ACK with a current sequence number and the acknowledgment number that acknowledges the last in order data. Upon receiving three (3) duplicate ACKs, a sender performs a fast retransmission of the missing segment if one is in the retransmission buffer. If the retransmission buffer is empty, the sender does nothing.

In the present approach, after receiving duplicate ACKs in a quantity that exceeds a specified strike factor and if the re-transmission buffer is empty, the sender sends a special acknowledgement message, termed a corrective acknowledgement message, carrying the correct sequence number and the correct ACK number, to the receiver. Upon receiving the corrective acknowledgment message, a receiver determines that the data in the receiver's re-assembly buffer is faulty, injected data. The receiver may make such a determination based on determining that the sequence number in the ACK segment is less than the data in the re-assembly buffer. Therefore, the segment(s) in the re-assembly buffer is(are) discarded. This approach provides a fast way to discard faulty injected data.

In one embodiment of the present approach, the strike factor is three (3). Alternatively, the strike factor is one or two; while a typical strike factor may be in the range of one to ten, in other embodiments any other specified strike factor may be used. With a strike factor of one, the sender does not wait for three duplicate ACKs but instead sends the corrective acknowledgment message for each duplicate ACK that is received at the sender when no data is unacknowledged.

Referring first to FIG. 5A, steps of a duplicate ACK approach are shown for a sender as an attacker is sending spurious segments. In step 502, a duplicate ACK is received. In step 504, the sender tests whether its re-transmission buffer is empty or contains an unacknowledged segment. If the buffer is not empty, then in step 506 a fast re-transmit operation is performed if required.

If the re-transmission buffer is empty, then the process assumes that the duplicate ACK is a false duplicate ACK resulting from injection of a spurious DATA segment. Therefore, in step 508, the value of a false duplicate ACK counter is incremented. Typically the false duplicate ACK counter has an initial value of zero and increments by one each time that step 508 is reached.

In step 510 the sender tests whether the false duplicate ACK counter value is equal to a specified strike factor. The strike factor is a fixed value set in advance according to a level of perceived risk, a level of security that is desired, or according to a desired level of response. In various embodiments, strike factor values of 1, 2, or 3 are typical. The strike value may be a configurable parameter that can be set, for example, in a configuration file, user interface panel, or through a command-line interface command issued to a network element that is executing an implementation.

If the false duplicate ACK counter is not equal to the strike factor, then in step 512 the approach returns control for performing regular TCP processing. The transfer of control is performed because the number of false duplicate ACK messages is not yet considered to exceed the risk level represented by the strike value. However, if the false duplicate ACK counter matches the strike value, then in step 514 a corrective acknowledgment message is sent to the sender, carrying the highest or correct sequence number for all data previously sent by the sender, and carrying a valid ACK value. The effect of step 514 is to re-synchronize a legitimate sender that has sent too many ACK messages, while preventing adverse effects that could arise in response to a malicious attacker if the duplicate ACK messages were processed in conventional manner by the receiver.

Referring now to FIG. 5B, steps performed by a data receiver are shown. In step 530 the corrective acknowledgment message is received. Other segments may be received prior to receiving the corrective acknowledgment message, but for purposes of illustrating a clear example the corrective acknowledgment message is shown as the next segment. In step 532, the receiver tests whether the SeqNo of the corrective acknowledgment message is less than the highest sequence number of any segment in the re-assembly buffer. If not, then control returns at step 507. If the SeqNo of the corrective acknowledgment message is less than the highest sequence number of any segment in the re-assembly buffer, then the re-assembly buffer contains at least some spurious injected data, although the specific location of the spurious data in the re-assembly buffer is not known. Therefore, in step 534, the entire re-assembly buffer is discarded. Thus, through the foregoing test, the receiver can determine that it has placed a spurious injected data segment in the re-assembly buffer, and can discard it. As a result, upstream applications are protected from spurious data.

Message flows in an example application of the foregoing approach are now described with reference to FIG. 5C, FIG. 5D. Assume that the strike factor is two (2), that a duplicate ACK counter maintained by Sender 102 has an initial value of zero, and that Sender 102 has no segments in its re-transmission buffer.

Sender 102 sends segment 509 with SeqNo 101, ACK 5001, and 50 bytes of data. The segment is received in order, and Receiver 106 sends ACK message 511 with SeqNo 5001 and ACK 152. Attacker 104 then injects spurious segment 513 with SeqNo 4000, ACK 1, and 256 bytes of malicious or spurious data. Receiver 106 sends an ACK message. Based on the SeqNo value of 4000, Receiver 106 then determines that segment 513 is received out of order. Therefore, Receiver 106 sends duplicate ACK message 516 with ACK value 152 and SeqNo 5001 for the purpose of providing Sender 102 with correct values. Sender 102 accumulates or increments its false duplicate ACK counter since its retransmission buffer is empty at step 518 so that the counter has a value of one.

Attacker 104 sends spurious segment 520 with SeqNo 5000, ACK 1, and 256 bytes of data. The SeqNo value in segment 520 is different than for segment 513 because Attacker 104 is guessing SeqNo values and does not know the allowed window or next expected SeqNo value. Based on the SeqNo value of 5000, Receiver 106 then determines that segment 520 is received out of order. Therefore, Receiver 106 sends duplicate ACK message 522, still with ACK value 152 and SeqNo 5001. Sender 102 increments its false duplicate ACK counter since its retransmission buffer is empty at step 524 so that the counter has a value of two.

At step 526 Sender 102 determines through the test of step 510 (FIG. 5A) that the false duplicate ACK counter is equal to the strike factor.

Referring now to FIG. 5D, in response to the determination of step 526, Sender 102 sends corrective ACK message 538 with SeqNo 152 and ACK 5001. Thus the corrective ACK message 538 declares correct values to Receiver 106. In response, at step 540 Receiver 106 determines that the SeqNo of corrective ACK message 538 is less than the SeqNo of a segment in the re-assembly buffer. As a result, Receiver 106 discards the spurious segment from the re-assembly buffer at step 542.

Figure 6:
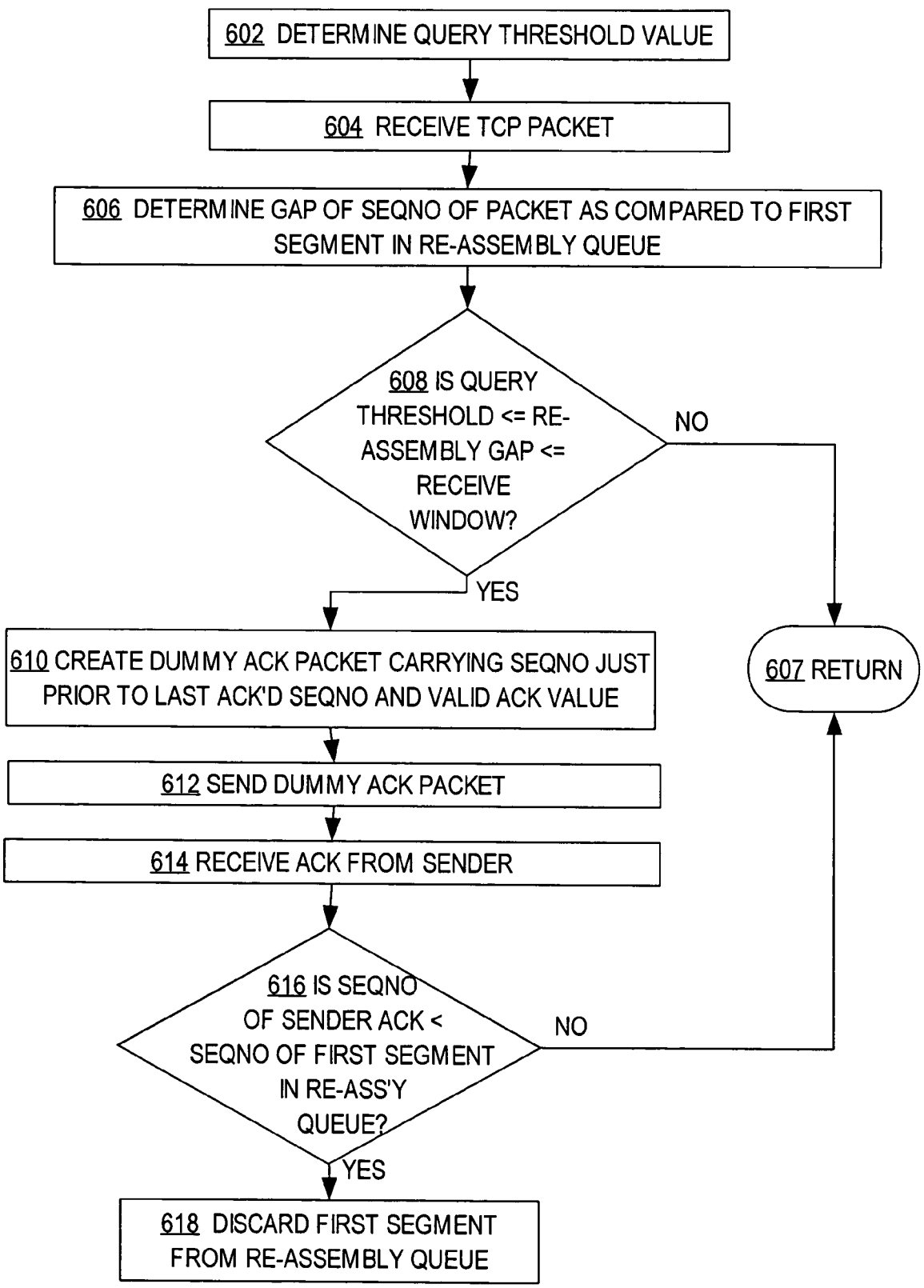
FIG. 6 is a flow diagram that illustrates an approach for removing spurious data segments from a re-assembly buffer based on analyzing a re-assembly gap.

2.4 Approach for Removing Spurious Data Segments from Re-Assembly Buffer Based on Analyzing Re-Assembly Gap FIG. 6 is a flow diagram that illustrates an approach for removing spurious data segments from a re-assembly buffer based on analyzing a re-assembly gap.

In step 602, a query threshold value ("query_threshold") is determined and stored. Techniques for selecting a query threshold value are described at the end of this section.

In step 604, a TCP segment is received. In step 606, a re-assembly gap value of the SeqNo of the received segment, as compared to the first segment in the re-assembly buffer, is determined. In this context, a re-assembly gap value ("reassm_gap") indicates a difference in bytes between the beginning of the first segment in the re-assembly buffer and the received segment. In one embodiment, the re-assembly gap value is determined as reassm_gap=(SeqNo of first segment in re-assembly buffer)—rcvnxt.

in which "rcvnxt" indicates the next segment that the TCP process expects to receive. The re-assembly gap value is then used as a trigger to determine whether data in the re-assembly buffer is faulty. In particular, at step 608 a test is performed to determine if the injected data satisfies the following relationship:

query_threshold<=reassm_gap<=rcvwnd where "rcvwnd" designates the receive window size. If the relationship does not hold, then control returns at step 607. If the relationship does hold, then the query_threshold value has been reached, meaning that the re-assembly gap is too large.

Therefore in step 610 a dummy ACK segment is created. In this context, "dummy ACK segment" means a TCP message that is formatted as a conventional ACK message but created and sent for the purpose of determining whether the endpoint is legitimate. Alternatively the dummy ACK segment may be termed a verification ACK segment or any other functionally equivalent term may be used as a label for the segment. The dummy ACK segment carries a SeqNo value that is just prior to the last properly acknowledged SeqNo value, and also carries a valid ACK value. In one embodiment, the SeqNo value is selected as: SeqNo<= (snduna—1), or any SeqNo older than a SeqNo already acknowledged. The ACK value may be any acceptable ACK value, e.g., ACK (rcvnxt). In the Flags portion of the TCP segment, the ACK bit is set. The dummy ACK segment is sent at step 612.

The purpose of the dummy ACK segment is to verify the authenticity of the data in the re-assembly buffer. In particular, sending a dummy ACK segment as described herein should cause a sender that is compliant with RFC 793 to respond with the correct SeqNo and ACK value. At step 614, an ACK message is received from the sender. In compliance with RFC 793, the ACK message provides the maximum sequence number that the sender has previously sent.

The receiver can then determine whether the data in the re-assembly buffer is spurious. In one embodiment, in step 616 the receiver tests whether the SeqNo of the sender ACK message received at step 614 is less than the SeqNo of the first segment in the re-assembly buffer. If so, then the segment in the re-assembly buffer is spurious and is discarded at step 618.

Thus, the foregoing approach recognizes that the connection between the sender and the receiver is in a synchronized state but for the spurious segments. Because only the sender and the receiver know the exact next expected SeqNo, the use of a dummy segment can be used to cause the sender to authenticate itself to the receiver by proving knowledge of the exact next expected SeqNo.

The query threshold value selected in step 602 and used in step 608 may be chosen using any of several approaches. In one embodiment, step 608 involves testing whether reassm_gap is greater than ½ the then-current window size. Alternatively the query_threshold value could be ⅓ of the then-current window size, ¾ of the window size, etc. The selected value may vary according to the level of perceived risk in the network. The query_threshold value also may be a configurable parameter value.

In another embodiment, the maximum segment size ("mss") is also considered. For example, step 608 may involve evaluating the relation if (reasm_gap>min(rcvwndsize/2, n*maxmss))

where n is a value selected by an application or programmatically controlled. In still another alternative the query threshold value may vary dynamically according to a value such as a function of bandwidth and delay, or a combination of round-trip time (RTT) estimate, available bandwidth, and window size.

The foregoing approach does not require changes to TCP logic used at a receiver, and therefore interoperability with existing implementations of TCP is maintained. The approaches of this section and section 2.3 may be used with existing fast retransmission and fast recovery methods as described in existing RFCs, without any modifications.

3.0 IMPLEMENTATION MECHANISMS—HARDWARE OVERVIEW

Figure 7:
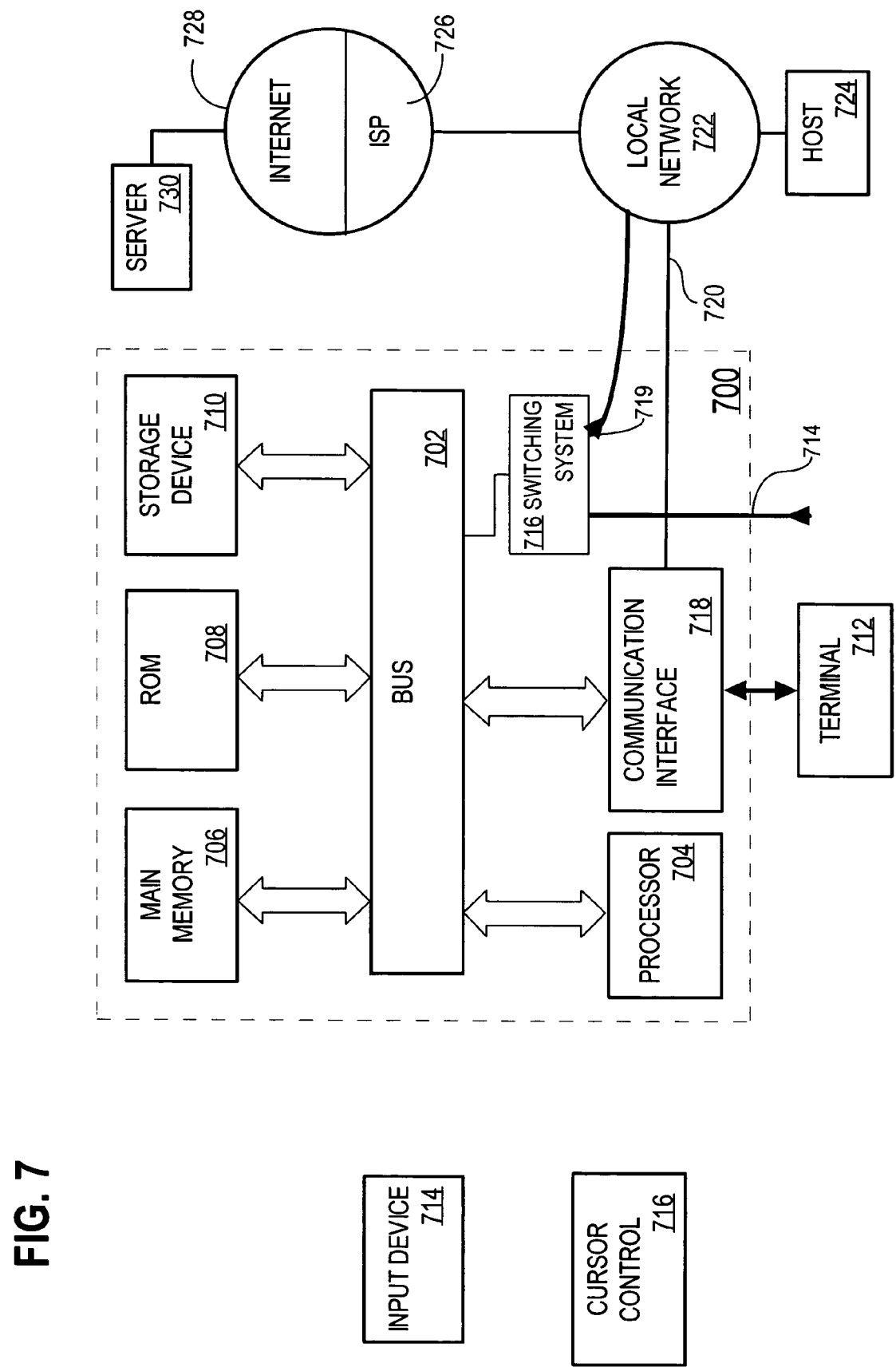
FIG. 7 is a block diagram that illustrates a computer system upon which an embodiment may be implemented.

FIG. 7 is a block diagram that illustrates a computer system 700 upon which an embodiment may be implemented. The preferred embodiment is implemented using one or more computer programs running on a network element such as a router device. Thus, in this embodiment, the computer system 700 is a router.

Computer system 700 includes a bus 702 or other communication mechanism for communicating information, and a processor 704 coupled with bus 702 for processing information. Computer system 700 also includes a main memory 706, such as a random access memory (RAM), flash memory, or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk, flash memory or optical disk, is provided and coupled to bus 702 for storing information and instructions.

A communication interface 718 may be coupled to bus 702 for communicating information and command selections to processor 704. Interface 718 is a conventional serial interface such as an RS-232 or RS-422 interface. An external terminal 712 or other computer system connects to the computer system 700 and provides commands to it using the interface 718. Firmware or software running in the computer system 700 provides a terminal interface or character-based command interface so that external commands can be given to the computer system.

A switching system 716 is coupled to bus 702 and has an input interface 714 and an output interface 719 to one or more external network elements. The external network elements may include a local network 722 coupled to one or more hosts 724, or a global network such as Internet 728 having one or more servers 730. The switching system 716 switches information traffic arriving on input interface 714 to output interface 719 according to pre-determined protocols and conventions that are well known. For example, switching system 716, in cooperation with processor 704, can determine a destination of a packet of data arriving on input interface 714 and send it to the correct destination using output interface 719. The destinations may include host 724, server 730, other end stations, or other routing and switching devices in local network 722 or Internet 728.

The invention is related to the use of computer system 700 for implementing the approaches herein. According to one embodiment of the invention, an implementation of the approaches herein is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. One or more processors in a multi-processing arrangement may also be employed to execute the sequences of instructions contained in main memory 706. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector coupled to bus 702 can receive the data carried in the infrared signal and place the data on bus 702. Bus 702 carries the data to main memory 706, from which processor 704 retrieves and executes the instructions. The instructions received by main memory 706 may optionally be stored on storage device 710 either before or after execution by processor 704.

Communication interface 718 also provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for detecting network data injection attacks as described herein.

Processor 704 may execute the received code as it is received, and/or stored in storage device 710, or other non-volatile storage for later execution. In this manner, computer system 700 may obtain application code in the form of a carrier wave.

4.0 EXTENSIONS AND ALTERNATIVES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of preventing an attack on a network, wherein the attack comprises injecting a spurious transmission control protocol (TCP) segment into a TCP connection between a sender and a receiver, the method comprising the computer-implemented steps of:
   receiving a duplicate TCP ACK message;
   incrementing a false duplicate ACK counter when a TCP re-transmission buffer maintained by the receiver is empty;
   when the false duplicate ACK counter is equal to a specified strike factor, and only when a TCP re-transmission buffer maintained by the receiver is empty, sending a corrective ACK message that provides a correct sequence value and ACK value.

2. A method as recited in claim 1, wherein the specified strike factor is a value inarange of 1 to 10.

3. A method as recited in claim 1, wherein the steps are performed by an endpoint node acting as the receiver of data in the TCP connection.

4. A method as recited in claim 1, wherein the steps are performed by a TCP application of an operating system of a network infrastructure element.

5. A method as recited in claim 1, wherein the steps are performed by a TCP process, stack, adapter or agent hosted by or associated with an operating system of a personal computer, workstation or other network end station.

6. A method as recited in claim 1, further comprising the steps of:
   receiving the corrective ACK message;
   determining whether the correct sequence value is less than another sequence value of a segment in a re-assembly buffer;
   discarding the segment from the re-assembly buffer when the correct sequence value is less than the other sequence value of a segment in the re-assembly buffer.

7. A method as recited in claim 6, wherein the discarding step comprises discarding all segments in the re-assembly buffer.

8. A method of preventing an attack on a network, wherein the attack comprises injecting a spurious transmission control protocol (TCP) segment into a TCP connection between a sender and a receiver, the method comprising the computer-implemented steps of:
   receiving a particular TCP segment;
   determining a sequence value gap as between the particular TCP segment and a prior TCP segment previously placed in a re-assembly buffer maintained by the receiver;
   determining whether the sequence value gap is too large according to a specified heuristic;
   if the sequence value gap is too large, then performing the steps of:
   creating and sending a dummy segment carrying a particular sequence value that is just prior to a last properly acknowledged sequence value;
   receiving an acknowledgment of the dummy segment;
   determining whether a second sequence value carried in the acknowledgment is less than a third sequence value of the first TCP segment; and
   discarding the particular TCP segment from the re-assembly buffer when the
   second sequence value carried in the acknowledgment is less than the third sequence value of the particular TCP segment.

9. A method as recited in claim 8, wherein the specified heuristic holds when a re-assembly gap value is greater than one-half of a then-current window size.

10. A method as recited in claim 8, wherein the specified heuristic holds when a re-assembly gap value is greater than the lesser of (a) one-half of a then-current window size or (b) a multiple of a maximum allowed segment size.

11. A method as recited in claim 8, wherein the specified heuristic holds when a query threshold is greater than a function of then-current bandwidth and then-current delay.

12. A method as recited in claim 8, wherein the specified heuristic holds when a query threshold is greater than a function of a round-trip time (RTT) estimate, a then-current available bandwidth value, and window size.

13. A method as recited in claim 8, wherein the specified heuristic holds when a query threshold value is less than or equal to a re-assembly gap value and the re-assembly gap value is less than or equal to a receive window value.

14. A method as recited in claim 13, wherein the re-assembly gap value comprises a sequence value of a first segment in the re-assembly buffer less a next expected segment value.

15. An apparatus for preventing an attack on a network, wherein the attack comprises sending a spurious transmission control protocol (TCP) segment with a spurious or unwanted DATA segment, the apparatus comprising:
   means for receiving a duplicate TCP ACK message;
   means for incrementing a false duplicate ACK counter when a TCP re-transmission buffer maintained by the receiver is empty;
   means sending a corrective ACK message that provides a correct sequence value and ACK value when the false duplicate ACK counter is equal to a specified strike factor and only when a TCP re-transmission buffer maintained by the receiver is empty.

16. An apparatus for preventing an attack on a network, wherein the attack comprises sending a spurious transmission control protocol (TCP) segment with spurious or unwanted DATA segment, comprising:
   a processor;
   one or more stored sequences of instructions that are accessible to the processor and which, when executed by the processor, cause the processor to perform:
   receiving a duplicate TCP ACK message; incrementing a false duplicate ACK counter when a TCP re-transmission buffer maintained by the receiver is empty; when the false duplicate ACK counter is equal to a specified strike factor, and only when a TCP re-transmission buffer maintained by the receiver is empty, sending a corrective ACK message that provides a correct sequence value and ACK value.

17. A computer-readable tangible storage medium carrying one or more sequences of instructions for preventing an attack on a network, wherein the attack comprises sending a spurious transmission-control protocol (TCP) segment with unwanted or spurious DATA, wherein the execution of the one or more sequences of instructions by one or more processors causes the one or more processors to perform:
receiving a duplicate TCP ACK message;
incrementing a false duplicate ACK counter when a TCP re-transmission buffer maintained by the receiver is empty;
when the false duplicate ACK counter is equal to a specified strike factor, and only when a TCP re-transmission buffer maintained by the receiver is empty, sending a corrective ACK message that provides a correct sequence value and ACK value.

18. The apparatus of claim 15 or 16, wherein the specified strike factor is a value in a range of 1 to 10.

19. The apparatus of claim 15 or 16, comprising an endpoint node acting as the receiver of data in the TCP connection.

20. The apparatus of claim 15 or 16, comprising a TCP application of an operating system of a network infrastructure element.

21. The apparatus of claim 15 or 16, comprising a TCP process, stack, adapter or agent hosted by or associated with an operating system of a personal computer, workstation or other network end station.

22. The apparatus of claim 15, further comprising:
means for receiving the corrective ACK message; means for determining whether the correct sequence value is less than another sequence value of a segment in a re-assembly buffer;
means for discarding the segment from the re-assembly buffer when the correct sequence
value is less than the other sequence value of a segment in the re-assembly buffer.

23. The apparatus of claim 16, further comprising sequences of instructions which when executed cause the one or more processors to perform: receiving the corrective ACK message; determining whether the correct sequence value is less than another sequence value of a segment in a re-assembly buffer;
segment in a re-assembly buffer;
discarding the segment from the re-assembly buffer when the correct sequence value is less than the other sequence value of a segment in the re-assembly buffer.

24. The apparatus of claim 15 or 16, operable to discard all segments in the re-assembly buffer.

25. An apparatus for preventing an attack on a network, wherein the attack comprises injecting a spurious transmission control protocol (TCP) segment into a TCP connection between a sender and a receiver, comprising:
means for receiving a particular TCP segment;
means for determining a sequence value gap as between the particular TCP segment and a prior TCP segment previously placed in a re-assembly buffer maintained by the receiver;
means for determining whether the sequence value gap is too large according to a specified heuristic;
means operable when the sequence value gap is too large for creating and sending a dummy segment carrying a particular sequence value that is just prior to a last properly acknowledged sequence value, for receiving an acknowledgment of the dummy segment, for determining whether a second sequence value carried in the acknowledgment is less than a third sequence value of the first TCP segment, and for discarding the particular TCP segment from the re-assembly buffer when the second sequence value carried in the acknowledgment is less than the third sequence value of the particular TCP segment.

26. An apparatus for preventing an attack on a network, wherein the attack comprises injecting a spurious transmission control protocol (TCP) segment into a TCP connection between a sender and a receiver, comprising:
a processor;
one or more stored sequences of instructions that are accessible to the processor and which, when executed by the processor, cause the processor to perform:
receiving a particular TCP segment;
determining a sequence value gap as between the particular TCP segment and a prior TCP segment previously placed in a re-assembly buffer maintained by the receiver;
determining whether the sequence value gap is too large according to a specified heuristic;
when the sequence value gap is too large, creating and sending a dummy segment carrying a particular sequence value that is just prior to a last properly acknowledged sequence value, receiving an acknowledgment of the dummy segment, determining whether a second sequence value carried in the acknowledgment is less than a third sequence value of the first TCP segment, and discarding the particular TCP segment from the re-assembly buffer when the second sequence value carried in the acknowledgment is less than the third sequence value of the particular TCP segment.

27. The apparatus of claim 25 or 26, wherein the specified heuristic holds when a re-assembly gap value is greater than one-half of a then-current window size.

28. The apparatus of claim 25 or 26, wherein the specified heuristic holds when a re-assembly gap value is greater than the lesser of (a) one-half of a then-current window size or (b) a multiple of a maximum allowed segment size.

29. The apparatus of claim 25 o 26, wherein the specified heuristic holds when a query threshold is greater than a function of then-current bandwidth and then-current delay.

30. The apparatus of claim 25 or 26, wherein the specified heuristic holds when a query threshold is greater than a function of a round-trip time (RTT) estimate, a then-current available bandwidth value, and window size.

31. The apparatus of claim 25 or 26, wherein the specified heuristic holds when a query threshold value is less than or equal to a re-assembly gap value and the re-assembly gap value is less than or equal to a receive window value.

32. The apparatus of claim 31, wherein the re-assembly gap value comprises a sequence value of a first segment in the re-assembly buffer less a next expected segment value.

* * * * *

UNITED STATES PATENT AND TRADEMARK OFFICE
CERTIFICATE OF CORRECTION

PATENT NO. : 7,257,840 B2 Page 1 of 1
APPLICATION NO. : 10/815218
DATED : August 14, 2007
INVENTOR(S) : Anantha Ramaish et al.

It is certified that error appears in the above-identified patent and that said Letters Patent is hereby corrected as shown below:

Claim 2, column 15, line 35, replace "inarange" with --in a range--

Claim 25, column 17, line 62, replace "dununy" with --dummy--

Signed and Sealed this

Sixteenth Day of September, 2008

JON W. DUDAS
*Director of the United States Patent and Trademark Office*